Dec. 29, 1936.   E. J. HIRVONEN   2,066,109
HYDRAULIC DRILLING MACHINE
Filed Nov. 30, 1934   2 Sheets-Sheet 1

Dec. 29, 1936.                E. J. HIRVONEN                 2,066,109
                         HYDRAULIC DRILLING MACHINE
                          Filed Nov. 30, 1934        2 Sheets-Sheet 2

Patented Dec. 29, 1936

2,066,109

UNITED STATES PATENT OFFICE 2,066,109

HYDRAULIC DRILLING MACHINE

Eric J. Hirvonen, Worcester, Mass., assignor to Leland-Gifford Company, Worcester, Mass., a corporation of Massachusetts Application November 30, 1934, Serial No. 755,405

4 Claims. (Cl. 121—45)

This invention relates to hydraulically actuated machine tools and particularly to hydraulically actuated drilling machines wherein the hydraulic drill advancing cylinder and piston are vertically disposed and are so operated as to advance the drill at different rates of speed to and from the work, at least the slow advance or cutting speed being maintained constant regardless of variations of work resistance. Such a machine is disclosed, for instance, in my copending application Serial No. 636,855, filed October 8, 1932, wherein the drill is advanced rapidly from a fully retracted position to a work engaging position and is then advanced slowly at a constant rate of speed into the work for a predetermined depth and then is retracted rapidly to a point wherein the drill clears the work, for the purpose of removing chips from the drill hole, and then is readvanced rapidly to the bottom of the hole and at slow speed again into the work and so on until the required depth of hole has been drilled, whereupon the drill is retracted rapidly to a fully retracted position. The drill is thus progressively advanced further into the work at each slow speed or working part of the stroke.

Some of the advantages of such a machine are the rapidity with which the machine functions and the accuracy of control of the speed of movement of the drill and the positions where the drill speed changes or reverses. Such advantages are obtained, however, only when the hydraulic cylinder that effects the advancement and retraction of the drill is free from air so that the cylinder on opposite sides of the piston is at all times filled with oil and is free from any sensible amount of air that by reason of its elasticity prevents the drill from advancing at a constant determined rate and delays the speed changing of the drill. The effects of entrapped air are particularly noticeable in a machine wherein the hydraulic cylinder and piston are vertical.

An object of the present invention is a hydraulically actuated machine tool, as a drilling machine, provided with hydraulic mechanism for operating the drill in a series of definite cycles each including movement of the drill at different speeds, an advancement of the drill into the work at constant speed, irrespective of variations of work resistance, and preferably also progressively increased distances of advance, combined with means for effecting the removal of air from the cylinder that reciprocates the drill in this manner.

A further object of the invention is the provision of a hydraulic actuating system for a drilling machine or the like wherein the piston is provided with an air bleed passage through which air that is entrapped in the lower end of the cylinder under the piston can pass into the upper portion of the cylinder and escape from the system without at the same time causing an appreciable loss of oil from the lower portion and also without at the same time losing oil that materially affects the rate of movement of the piston.

A further object is generally to improve the construction and operation of hydraulically actuated machine tools.

Fig. 3 is an enlarged sectional detail of the piston and cylinder of Fig. 2 and illustrating more clearly the air bleed valve forming a part of the present invention.

Fig. 4 is an exploded view of the valve structure of Fig. 3.

Figs. 5 and 6 are sectional views taken respectively along lines 5—5 and 6—6, respectively, of Fig. 3.

Figure 1:
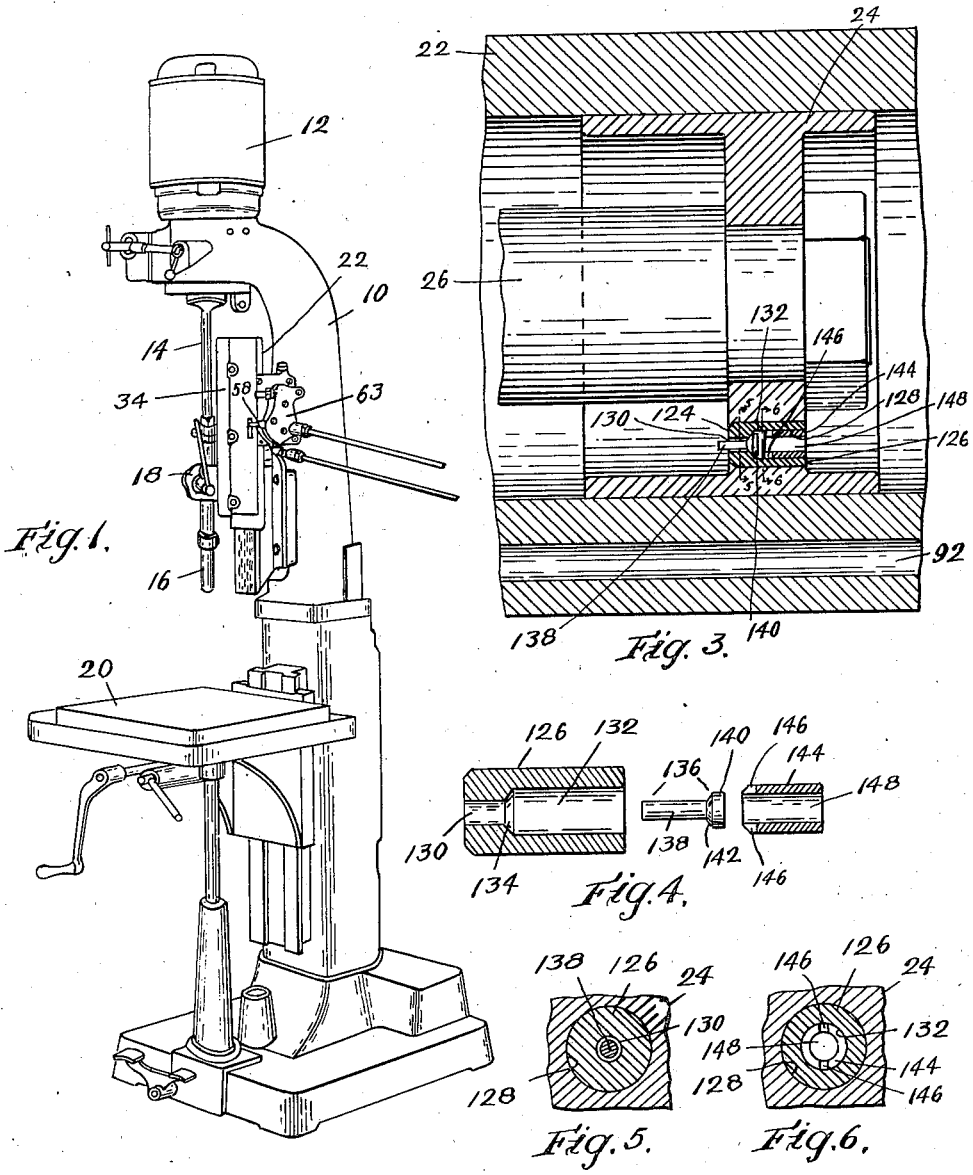
Fig. 1 is a perspective view of a hydraulic drilling machine embodying the present invention.
Figure 2:
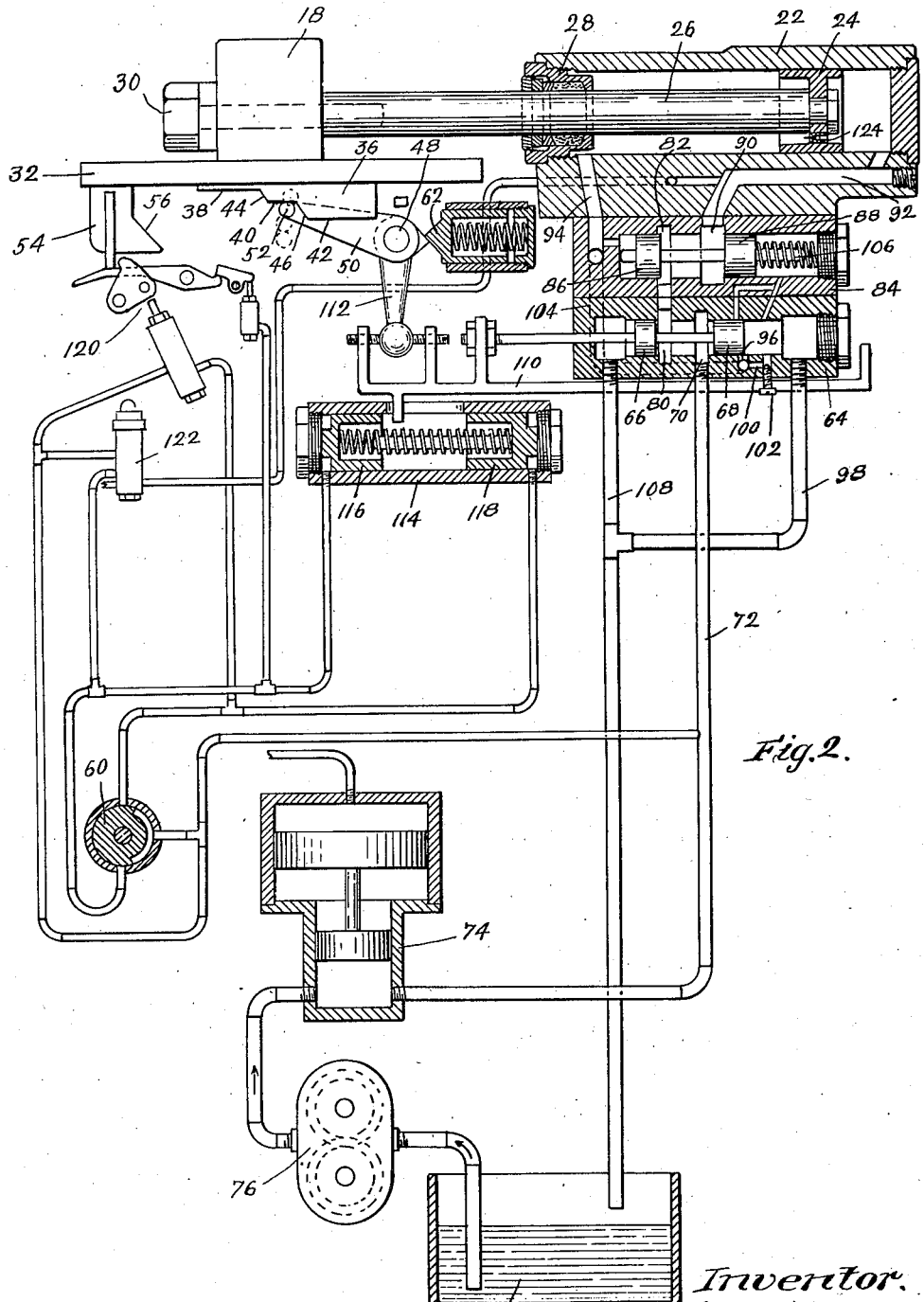
Fig. 2 is a diagrammatic view of the hydraulic system including the cylinder and piston for reciprocating the drill spindle of the machine of Fig. 1.

The drilling machine embodying the present invention, and as illustrated in Fig. 1, comprises a vertical frame 10 which supports a spindle driving motor 12. The motor shaft 14 has a sliding driving connection with the vertical drill spindle 16 carried by a vertically reciprocating carriage 18. A drill, not shown, is adapted to be carried by the lower end of the drill spindle 16 and to be reciprocated into and out of engagement with work supported upon a vertically adjustable table 20. The carriage 18 is reciprocated by means including the hydraulic cylinder 22. The hydraulic cylinder, see particularly Fig. 2, contains a piston 24 which is fixed to the upper end of a piston rod 26 that passes through a stuffing box 28 at the lower end of the cylinder, the lower end of said piston rod being fixed rigidly to the carriage 18 by suitable means as the bolt 30. Thus the carriage is constrained to reciprocate with the piston. The carriage 18 has movable with it a cam plate 32 which, in Fig. 1, is contained within the control box 34. A cam block 36 is carried by and is at times reciprocable with said plate 32 and at other times held stationary while said cam plate continues to move for the purpose of obtaining successively advanced feeding strokes and also for resetting the cam block at the end of the operating cycle. The particular manner in which this is accomplished is set forth in my above referred to application but is not necessary to be described in detail for an understanding of the present invention. The cam block 36 is provided with horizontal or dwell portions 38, 30 and 42 connected by inclined cam portions 44 and 46, respectively. A valve-mechanism control shaft 48 is provided with a cam operated arm 50 having a laterally extended pin 52 that cooperates with the aforesaid dwell portions and cam surfaces. When the pin is on the dwell portion 38 the arrangement is such that the piston and drill are advancing at fast speed advance toward the work. When the cam portion 44 engages the pin and raises it from the uppermost dotted position to the full line position the control shaft sets valve mechanism to slow down the speed of the piston and drill and cause the drill to advance at slow or cutting speed. Said pin also serves to hold the cam plate stationary relative to the advancing cam plate 32. When the cam plate has moved a predetermined distance the cam surface 46, which is movable independently of the cam block, causes the arm 50 to be thrown downwardly into the lowermost dotted line position, thereby to effect the rapid retraction of the piston and drill. The cam plate 32 is provided at one end thereof with a cam block 54 having a cam surface 56 that in the fully retracted position of the piston and drill engages the pin 52 and moves it from the lowermost dotted line position into the next uppermost position. This position is a neutral position of the control arm and the mechanism controlled by said arm causes the piston to be held stationary in the fully retracted position determined by the setting of the cam block 54. The control arm 50 with its shaft 48 can be thrown forwardly into starting position manually by the operation of the control lever 58, see Fig. 1, and also by the operation of a control valve 60, Fig. 2. A spring pressed plunger 62 is operative on the shaft 48 to move the shaft rapidly from slow speed advance into reverse positions and also to hold the shaft positively in both fast advance and slow advance positions.

The hydraulic control mechanism for the piston and cylinder, indicated generally by the numeral 63 in Fig. 1, includes a valve cylinder 64 having a double piston 66, 68 therein. The valve cylinder receives high pressure oil through a port 70, which in the fast and slow advance settings of the valve piston is disposed between the piston 66, 68. High pressure oil is supplied to the port 70 through a pipe 72 from an accumulator 74 which is supplied with oil through a constantly operating oil pump 76 drawing oil from an oil reservoir 78. In the drill-advance setting of the piston 66, 68, oil can pass freely from the inlet port 70 through the outlet port 80 into the inlet port 82 of a speed regulating cylinder 84 having a double piston valve 86, 88 therein. In the normal position of the valve pressure oil passes from the port 82 along the valve cylinder and out of the port 90 into the passage 92 and thence into the upper end of the cylinder where it acts upon the piston 24 in a direction to move it downwardly toward the work. The cylinder under the piston, in the normal operation of the machine, is adapted to be completely full of oil, which oil is forced out of the lower side of the cylinder through a pipe 98 and into the reservoir 78 by the greater piston pressure set up by the pressure of oil on the upper side of the piston, the oil flowing through the passage 94 and the port 96 into the right hand end of the valve cylinder 64 where the oil escapes.

The condition above described is that which causes the piston to advance rapidly toward the work. When the piston has advanced so as to bring the drill almost into engagement with the work the valve piston 66, 68 is moved towards the right by the action of the aforesaid cam block 36 to partly restrict the outlet port 80 and to close the exhaust port 96. Oil pressure on the under side of the piston is then built up because the oil outlet is restricted, the oil now being constrained to flow from the passage 94 into the valve cylinder through a restricted passage 100 controlled by a speed setting valve 102. The setting of this valve determines the rate at which the piston can advance. The increased pressure in the under side of the cylinder acts through a restricted passage 104 connected with the passage 94 to apply pressure to the left hand end of the speed regulating piston 86. This pressure opposes the pressure of the spring 106 and a balance is established with the piston 86 partly throttling the inlet port 82. The pressure on the underside of the piston varies with varying work resistance and the valve 86 operates to vary the opening of the port 82 in such manner as to admit oil to the upper side of the piston to maintain the rate of slow speed advance of the piston constant regardless of variations in work resistance. When the control valve 66, 68 is moved to its extreme right hand position, for rapid return of the piston and drill, the piston 66 is disposed between the ports 70 and 80 and the piston 68 is disposed at the right hand side of the port 96. Under these conditions pressure oil can flow from the portion 70 into the port 96 and thence into the under side of the cylinder while the upper side of the cylinder is in communication through the port 80 and the waste passage 108 with the oil reservoir. Thus the piston is retracted rapidly into fully retracted position. In fully retracted position the piston valve 66, 68 is moved into a position where the piston 66 covers the port 80 and the piston 68 covers the port 96 and the outlet end of the passage 100, thereby sealing the oil in the cylinder on both sides of the piston against escape.

The piston valve 66, 68 is operated by the reciprocating member 110 actuated by an arm 112 fixed to the shaft 48. The piston valve is also moved into positions for effecting advance and also retraction of the drill by a cylinder 114 having pistons 116 and 118 respectively that are engageable with a part of the member 110, the pistons being actuated by a fluid pressure under control of the manually operated valve and also under control of mechanism 120 for effecting the advance of the drill from an intermediate retracted position, and also a device 122 responsive to excess work resistance for effecting the repeated retraction of the drill from the work, not necessary to explain in detail here.

The system as thus described depends mainly for its accuracy of operation and rapid response to changes in the settings of the control valves to the incompressibility of the hydraulic actuating fluid and the absence of air from the cylinder 22. Air is always present in the ducts and piping after the machine has been out of operation for an extended period and it is highly desirable to purge the system from air in order that prompt and accurate response of the piston 24 may result from the change of setting of the control valves. For instance, the feed of the drill is maintained constant at slow speed irrespective of variations in work resistance by entrapping a solid body of oil under the piston 24 and causing the escape of this oil at a predetermined rate. The solid body of oil also prevents the tool from jumping forward as the drill breaks through the work. If, however, a bubble of air is entrapped in the body of oil under the piston the elasticity of the compressed air bubble defeats the function of the entrapped oil since the expansion of the bubble tends to maintain constant the back pressure of the entrapped oil on the piston at times when the pressure should be variable. For the same reason the expansion of the entrapped compressed bubble causes the tool to jump forward when it breaks through the work. The response of the piston to changes of settings of the control valves is also slow due to the bubble since the variations of pressure are absorbed in compressing or permitting the expansion of the bubble; and the tool will hang at a certain setting where it should instantly change its speed and advance at the changed speed.

In accordance with this invention means are provided to purge the cylinder 22 from entrapped air and especially from air that may be entrapped in the lower part of the cylinder under the piston especially since the cylinder and piston are vertically disposed. The purging means comprises a valve structure 124 located in the piston 24 and establishing communication between the oil spaces in the cylinder on opposite sides of the piston. Said valve structure is illustrated more particularly in Figs. 3 through 6. Said valve structure comprises a bushing 126 which is inserted in a hole 128 passing through the web of the piston and is an oil tight pressure fit therein. The bushing 126 is provided at one end with a small diameter axially disposed bleed passage 130 which opens into a larger coaxial passage 132 that extends to the other end of the bushing. A conical valve seat 134 forms the junction between the two passages. A valve member 136 is located in said bushing, the valve having a stem 138 which is disposed loosely in the small passage 130 and an enlarged head 140 which is disposed in the large passage 132. The head is also formed with a conical face 142 which is adapted to rest upon the valve seat 134 of the bushing to close the bleed passage. A shell 144 is pressed in the passage 132 above the head of the valve to retain the valve in place, the inner end of the shell being sufficiently spaced from the head of the valve member to allow the valve member to operate, and the inner end having transverse slots 146 that permit fluid to pass from the valve chamber 132 into the axial passage 148 of the shell when the head of the valve is in contact with the inner end of the shell. The small passage 130 of the bushing is adapted to be slightly larger in diameter than that of said valve stem 138 and the difference in diameters provides a bleed passage of small cross section and also one of large surface through which the air entrapped in the under side of the piston can pass through the piston. The area of the bleed passage, however, is adapted to be sufficiently small so that the amount of oil that can pass through the passage at each rapid return traverse of the piston is negligibly small, the relatively large surface of the passage tending to keep down the flow of oil. In practice for a cylinder of two inches diameter it has been found satisfactory to have about five thousandths of an inch difference in diameter between the valve stem and the passage 130, with a valve stem diameter of about thirty-five thousandths of an inch. The bleed passage thus is seen to be very small in area.

When the system is first put in operation the actuating cylinder 22 and the oil ducts communicating therewith contain air. On the first downward stroke of the piston in a working direction there may be both pressure oil and compressed air in the upper part of the cylinder and air may be in the lower part of the cylinder and compressed under the downwardly moving piston, the air being driven out through the pipe 92 and the port 96. The high speed advance position of the first stroke of the piston is thus more rapid than is intended since the air can escape much more freely than oil. When the piston reaches a point in its travel where the regulating valve is moved from the high speed to the low speed advance position the escape of air from the under side of the piston is retarded but still can escape much faster than oil through the regulating passage 100 and usually sufficiently fast so that there is not enough back pressure set up to operate the constant speed valve 86, 88. Thus the rate of slow speed advance is also greater than desired. When, however, the piston reaches the bottom of its stroke and pressure oil is admitted to the under side of the piston and the cylinder above the piston is vented freely to the oil reservoir 78 and to the atmosphere the pressure oil flowing into the lower part of the cylinder forces the entrapped air through the valve structure 124 into the upper part of the cylinder where the air can escape through the relatively short passages 92 and the valve ports to the atmosphere. It might be stated that in practice waste passages 98 and 108 are omitted, the valve cylinder 64 being freely open at the ends to the atmosphere, although in a confined space where the oil is collected and returned in the oil reservoir 78 so that the passages through which the escaping air can pass to the atmosphere are relatively short. The entrapped air in the lower end of the cylinder is largely expelled therefrom in the first return stroke of the piston. In any event after one or two strokes the system becomes completely filled with oil and the apparatus functions in the normal intended manner. Since the cylinder 22 is vertical the air expelled through the valve structure 124 on the return traverse of the piston passes upwardly through the body of oil contained in the upper end of the cylinder between the piston and the entrance to the passage 92 so that the air is forced ahead of the oil, the volume of oil in the cylinder above the piston being more than sufficient to fill the outlet passages, and hence the first stroke is sufficient ordinarily to completely fill the working side of the cylinder with oil. While the valve structure 124 is open on each return traverse of the piston due to the greater pressure of oil under the piston than on top of the piston, the bleed area through the valve structure is so small that the amount of oil that can escape is negligible and does not put any sensibly increased demand upon the accumulator 74 or the pump 76. The small amount of oil that can pass through the valve structure during the return traverse is, however, of no importance in so far as effecting the speed of the piston is concerned, since precise uniformity of rate of speed of the return traverse is not necessary. The bleed passage through the valve structure, however, is sealed on the working traverse of the piston and hence there is no escape of oil from the working side of the cylinder and thus the associated valve structure can maintain an unvarying predetermined rate of advance of the piston and associated drill.

I claim:

1. Hydraulically actuated mechanism comprising a cylinder, a piston therein, a piston rod connected therewith, means including a valve mechanism for admitting pressure hydraulic fluid to and the escape of fluid from the opposite ends of said cylinder alternately, said piston having a passage therethrough, and a valve that opens and closes said passage in response to pressures on opposite sides of said piston, said valve having a flow-restricting stem in said passage having a cross-sectional area slightly less than that of said passage and thereby restricting the flow of fluid in said passage.

2. Hydraulically actuated mechanism comprising a cylinder, a piston therein, a piston rod connected therewith, means including a valve mechanism for admitting pressure hydraulic fluid to and the escape of fluid from the opposite ends of said cylinder alternately, and means for purging said cylinder at least on one side of said piston from entrapped air, said means comprising a valve structure including a bushing located in a passage extended through opposite faces of said piston, said bushing having an axially-directed small bleed passage extended thereinto from one end, an axially-directed large passage extended into said bushing from the other end and opening into said bleed passage, a valve having a head in said large passage and seating over the inner end of said bleed passage and having a stem movable axially in said bleed passage, said stem being but slightly smaller in diameter than the diameter of said bleed passage whereby the clearance passage between the stem and passage has small area and large surface, and a shell in said large passage confronting said valve head and defining the open position of said valve and having an inner end notch opening into a central passage therethrough.

3. Hydraulically actuated mechanism comprising a cylinder, a piston therein, valve mechanism for controlling the flow of a hydraulic fluid into and out of said cylinder on opposite sides of said piston, and means for purging said cylinder at least on one side of the said piston of air comprising a bushing in said piston having a small diameter fluid passage therethrough open to opposite sides of said piston, a free valve in said passage controlling the flow of fluid therethrough and opening and closing in response to fluid pressure differences on opposite sides of it, said valve having a stem movable axially in said passage and being only slightly smaller in diameter than the diameter of said passage, the space between said stem and passage constituting an air purging passage, and a valve-retaining shell in said passage having notched end confronting and spaced from said valve and constituting a stop member defining the open position of said valve, said shell having a fluid passage therethrough.

4. The combination with a hydraulically operated cylinder and piston, of means for purging air from the cylinder on one side of the piston into the cylinder on the other side of the piston while preventing deleterious flow of hydraulic liquid through said purging means, said purging means comprising a small diameter passage of short axial length through said piston, a stem in said passage having but slightly less diameter than the diameter of said passage whereby to provide an annular flow path of small thickness and large surface, and means for reciprocating said stem axially of said passage to keep it clear of obstruction.

ERIC J. HIRVONEN.